Sept. 5, 1967  B. I. WHITLOCK  3,339,429
DYNAMIC BALANCING SYSTEM FOR ROTATING SHAFTS
Filed April 26, 1965

INVENTOR
BEAUFORD I. WHITLOCK

Richards, Harris & Hubbard
ATTORNEY

United States Patent Office 3,339,429
Patented Sept. 5, 1967

3,339,429
DYNAMIC BALANCING SYSTEM FOR
ROTATING SHAFTS
Beauford I. Whitlock, Stafford, Kans., assignor to AWB Manufacturing Co., Inc., Stafford, Kans., a corporation of Kansas
Filed Apr. 26, 1965, Ser. No. 450,873
8 Claims. (Cl. 74—573)

This invention relates generally to the dynamic balancing of rotating bodies, and more particularly, but not by way of limitation, relates to a dynamic balancing system for vehicular drive shafts, motor shafts and other industrial shafts and the like.

In the trucking industry, excessive wear of bearings for the drive train of a road tractor is a recurring and expensive problem. The short life of the bearing system is to a large extent attributable to imbalances in the drive shaft extending from the transmission to the differential. Since it is virtually impossible to test the balance of a drive shaft once it is installed, it is extremely difficult to properly balance the shaft so as to prevent excessive wear and damage to the bearings. Also, the drive shaft is exposed to mud, dirt and other material which cakes on the shaft and tends to further imbalance the shaft. The same general problems are inherent in a large number of industrial applications wherein a rotary shaft of some type is used. Accordingly, this invention is applicable to rotating shafts in general, and is particularly adapted for use on the drive shaft of an automotive vehicle such as a truck.

An object of the invention is to provide a dynamic balancing system which may be quickly and easily attached to substantially any rotating shaft so as to balance the shaft and the associated rotary system.

Another object of the invention is to provide such a system which is relatively inexpensive to manufacture.

A further object of the invention is to provide such a system which can be easily installed on shafts of different diameter.

Still another object of the invention is to provide such a system which may be installed on a shaft which is subjected to intense vibration during use, such as the drive shaft of an automotive vehicle.

A further object of the invention is to provide such a system which may be securely attached to the shaft without altering or significantly damaging the shaft.

These and other objects are accomplished by means of a clamp fastened to the shaft and secured against longitudinal or rotational movement with respect to the shaft, a plurality of arms fastened to the clamp, and a dynamic balancing ring attached to the ends of the radially extending arms and disposed concentrically about the shaft.

In accordance with a more particular aspect of the invention, the clamp means is comprised of a pair of clamp halves disposed on opposite sides of the shaft and drawn together by means of threaded tension members interconnecting the adjacent ends of the clamp halves. The clamp means are so formed as to be automatically centered on any cylindrical shaft and the radial arms are adjustably connected to the clamp halves such that the radial arms are retained in approximately the same position with respect to the balancing ring as the clamp halves are attached to shafts of varying sizes.

Additional aspects, objects and advantages of the invention will be more evident to those skilled in the art from a perusal of the following description of a preferred embodiment of the invention and the accompanying drawings, wherein.

Figure 1:
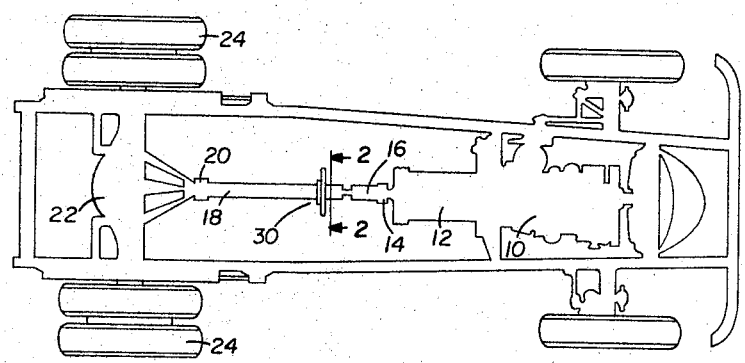
FIGURE 1 is an outline plan view of the frame and drive train of an automotive tractor on which a balancing system constructed in accordance with this invention has been installed.

Referring now to FIGURE 1, a conventional truck having an engine 10, transmission 12, front universal joint 14, slip joint 16, drive shaft 18, rear universal joint 20 and differential 22 is illustrated in plan outline. The differential 22 is connected through rear axles to the drive wheels 24 of the tractor. A dynamic balancing assembly constructed in accordance with the present invention and indicated generally by the reference numeral 30 is installed on the drive shaft 18.

Figure 2:
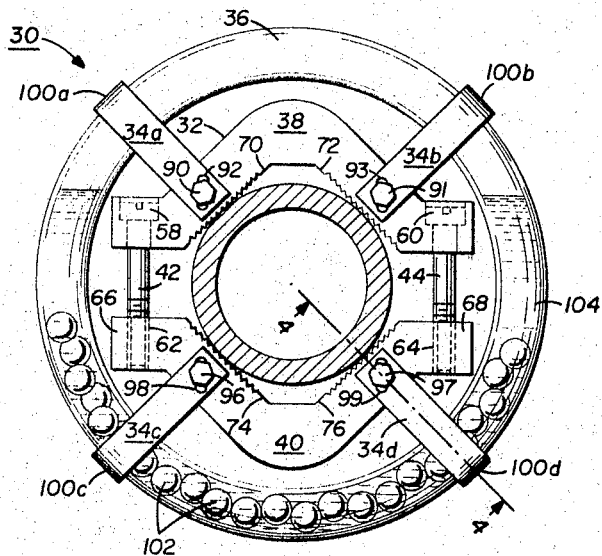
FIGURE 2 is a sectional view taken substantially on lines 2—2 of FIGURE 1 showing details of the balancing system constructed in accordance with the present invention.
Figure 4:
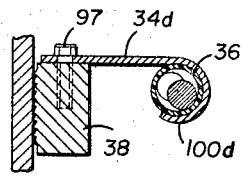
FIGURE 4 is a sectional view taken substantially on lines 4—4 of FIGURE 2.

As can best be seen in FIGURE 2, the balancing assembly 30 is comprised of a clamp means indicated generally by the reference numeral 32, a plurality of radially extending arms 34a–34d which are connected to the clamp means 32, and a dynamic balancing ring 36 which is secured to the outer ends of the arms 34a–34d.

More specifically, the clamp means 32 is comprised of a pair of generally V-shaped clamp halves 38 and 40 which are disposed on opposite sides of the shaft 18. A pair of threaded bolts 42 and 44 interconnect the adjacent ends of the clamp halves 38 and 40 and draw the clamp halves tightly against the shaft 18. The clamp half 38 has a pair of bores 46 and 48 which extend through ears 50 and 52, respectively, to pass the bolts, and counterbores 54 and 56 which receive the heads 58 and 60 (shown in dotted outline in FIGURE 2). The heads 58 and 60 may be provided either with screw driver slots or Allen wrench sockets. The clamp half 40 has threaded bores 62 and 64 extending through ears 66 and 68 to receive the threaded ends of the bolts 42 and 44.

Figure 5:
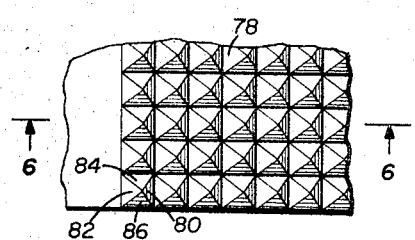
FIGURE 5 is an enlarged view of a portion of the serrated face of the clamp half illustrated in FIGURE 3.
Figure 6:
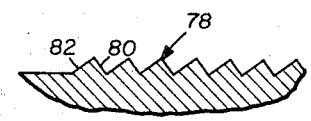
FIGURE 6 is a sectional view taken substantially on lines 6—6 of FIGURE 5.
Figure 3:
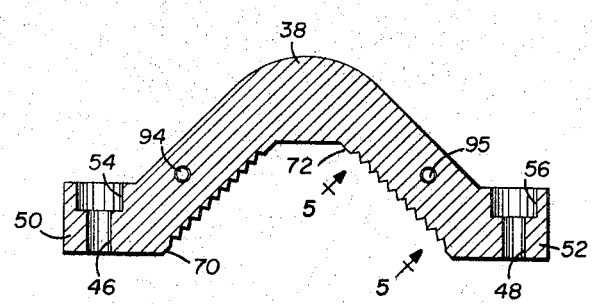
FIGURE 3 is a sectional view taken through one clamp half of the balancing system of FIGURE 2.

The clamp half 38 has generally flat faces 70 and 72 which are disposed at substantially 90° so that the clamp half 38 will be automatically centered on the shaft 18. The clamp half 40 has generally flat faces 74 and 76 for the same purpose. Each of the faces 70, 72, 74 and 76 is serrated as illustrated in FIGURES 5 and 6 so as to secure the assembly 30 on the shaft 18 and prevent slippage as the shaft is subjected to intensive and pronounced vibration. The serrations 78 are preferably pyramidal in shape as illustrated in FIGURES 5 and 6, but the faces 80 are at a steeper angle than the faces 82 so as to facilitate removal of the clamp halves from the casting molds. The other two opposite faces 84 and 86 of the pyramids may be at 45° to the faces.

The radially extending arms 34a and 34b are connected to the clamp half 38 by bolts 90 and 91 which pass through elongated slots 92 and 93 and are threaded into tapped bores 94 and 95. The elongated slots 92 and 93 are positioned at approximately 45° to the longitudinal dimension of the arms 34a and 34b so as to be aligned parallel one with the other and so as to be aligned in the direction in which the clamp 38 moves relative to the balancing ring 36 as the clamp means 32 is tightened on shafts of different sizes. The arms 34c and 34d are similarly connected to the clamp half 40 by bolts 96 and 97 which are passed through elongated slots 98 and 99 and threaded into tapped bores as heretofore described in connection to the clamp half 38. The elongated slots 98 and 99 are also disposed so as to be aligned in parallel relationship in the direction of movement of the clamp half 40 as the clamp means 32 is tightened around shafts of different sizes. The arm 34a–34d are provided with hook portions 100a–100d, respectively, at the outer ends thereof which extend around slightly more than one-half of the balance ring 36 so that the balance ring 36 may be snapped into the hooks 100a–100d.

The dynamic balancing ring 36 may be of any suitable type and preferably comprises a continuous tube of plastic or the like partially filled with balls 102 and liquid 104. The design and fabrication of the balancing ring 36 is known in the art and does not, per se, constitute a novel subcombination of the present invention.

The balancing assembly 30 may be installed on the shaft 18 in a number of different ways, but will customarily be installed by first placing the arms 34a–34d in position on the ring 36, connecting the clamp means 32 on the shaft, and then connecting the arms 34a–34d to the clamp means. Or, the system may be loosely assembled and slipped over the end of the shaft, then the clamp means 32 tightened about the shaft and the bolts 90, 91, 96 and 97 tightened. It will be appreciated that the balance ring 36 must be disposed concentrically about the shaft 18 with considerable precision. The V-shape of the serrated faces of the clamp halves 38 and 40 automatically centers the clamp halves on the shaft when the adjacent ends of the clamps are equally spaced. The diagonal grooves 92, 93, 98 and 99 permit the balance ring 36 to be adjustably positioned about the shaft even though the shaft may be of varying diameter because the arms 34a–34d always remain at the same position with respect to the ring 36.

Once the balancing assembly 30 is installed and the shaft 18 rotated at operational speeds, the balls 102 and liquid 104 will be distributed by centrifugal force about the periphery of the tubular ring in such a manner as to effectively balance the shaft 18 and associated rotary system so as to materially reduce the wear of the bearings associated with the drive train.

Although the invention is particularly suitable for use in connection with automotive vehicles, and in particular with trucks, the balancing assembly may be applied to any rotating shaft which is so exposed or situated to permit installation of the assembly. For example, the balancing assembly may be installed on the ends of shafts extending from electric motors, gearboxes, and other industrial drive shafts and will assist in balancing the entire rotating system under adverse conditions.

Although a preferred embodiment of the invention has been described in detail, it is to be understood that various changes, substitutions and alterations can be made therein without departing from the spirit and scope of the invention as defined by the appended claims.

What is claimed is:

1. The dynamic balancing assembly for a rotating shaft which comprises:
    clamp means for connection around the shaft including a pair of clamp halves generally V-shaped and each has a pair of serrated faces for engaging a cylindrical shaft at two circumferentially-spaced points, the faces having a concave radius of curvature at least greater than the radius of curvature of the shaft and being correspondingly formed with respect to a line bisecting the angle between the faces whereby each clamp half will be automatically centered on cylindrical shafts of different diameters,
    a plurality of arms connected to the clamp means and extending from the shaft at circumferentially-spaced points, and
    a dynamic balancing ring connected to the arms for disposition concentrically about the shaft.

2. The combination defined in claim 1 wherein:
    the dynamic balancing ring has a circular cross section, and
    each of the arms has a hook means formed in the end thereof for receiving and holding the ring against centrifugal force.

3. In a dynamic balancing assembly for a rotating shaft, the combination of:
    clamp means for connection around the shaft comprising a pair of generally V-shaped clamp halves for disposition on opposite sides of the shaft and adjustable tension means interconnecting the adjacent ends of the clamp halves for tightening the clamp halves against opposite sides of the shaft,
    a plurality of arms adjustably connected to each clamp half, an equal number of arms being connected to each clamp half, and
    a dynamic balancing ring connected to the ends of the arms for disposition concentrically about the shaft.

4. In a dynamic balancing system for a rotating shaft, the combination of:
    a dynamic balancing ring for concentric disposition about the axis of rotation of a shaft,
    a plurality of arms connected to the balancing ring at circumferentially spaced points and extending radially inwardly toward the center of the ring, and
    clamp means for connection around the shaft adjustably connected to the inner ends of the arms to permit connection of the clamp means to shafts of different diameters while maintaining the ring disposed concentrically about the axis of rotation of the shaft.

5. The combination defined in claim 4 wherein:
    the clamp means comprises a pair of clamp halves for disposition on opposite sides of the shaft and adjustable tension means interconnecting the adjacent ends of the clamp halves for drawing the clamp halves against opposite sides of the shaft, and
    the clamp means is adjustably connected to each of the arms by a bolt passing through an elongated slot in each arm and threaded into the respective clamp half, the elongated slots being disposed parallel one to the other and aligned with the direction of movement of the clamp halves as the clamp halves are tightened against opposite sides of the shaft by the adjustable tension means.

6. The combination defined in claim 5 wherein:
    there are an equal number of arms connected to each clamp half.

7. The combination defined in claim 6 wherein:
    each arm connected to each clamp half extends radially opposite from an arm connected to and extending from the other clamp half.

8. The combination defined in claim 7 wherein there are four arms at equally spaced positions around the circumference of the ring.

References Cited

UNITED STATES PATENTS

| 1,305,150 | 5/1919 | Myers | 74—573 |
| 1,313,039 | 8/1919 | Akimoff | 74—573 |
| 3,149,502 | 9/1964 | Caruso et al. | 74—573 |

FOREIGN PATENTS 26,464  11/1906  Austria.

FRED C. MATTERN, JR., Primary Examiner.

W. S. RATLIFF, Assistant Examiner.